(12) United States Patent
Okada

(10) Patent No.: US 10,518,649 B2
(45) Date of Patent: Dec. 31, 2019

(54) MOTOR VEHICLE

(71) Applicant: TOYOTA JIDOSHA KABUSHIKI KAISHA, Toyota-shi, Aichi-ken (JP)

(72) Inventor: Kiyohito Okada, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 135 days.

(21) Appl. No.: 15/907,490

(22) Filed: Feb. 28, 2018

(65) Prior Publication Data
US 2018/0264958 A1 Sep. 20, 2018

(30) Foreign Application Priority Data

Mar. 14, 2017 (JP) .................................. 2017-048156

(51) Int. Cl.
*B60L 11/18* (2006.01)
*H02P 27/06* (2006.01)
*B60L 3/00* (2019.01)

(52) U.S. Cl.
CPC ......... *B60L 11/1816* (2013.01); *B60L 3/0084* (2013.01); *H02P 27/06* (2013.01); *B60L 2210/40* (2013.01)

(58) Field of Classification Search
CPC .............. B60L 11/1816; B60L 3/0084; B60L 2210/40; B60L 53/14; B60L 50/51; H02P 27/06; Y02T 10/7005; Y02T 10/7241; Y02T 10/642
See application file for complete search history.

(56) References Cited

U.S. PATENT DOCUMENTS

| 7,816,804 B2* | 10/2010 | Soma ...................... B60L 58/20 307/10.1 |
| 2008/0143183 A1* | 6/2008 | Hoshiba .................. B60L 3/003 307/31 |
| 2012/0098490 A1* | 4/2012 | Masuda .................. B60L 53/18 320/109 |
| 2013/0320911 A1* | 12/2013 | Kamiya .................... H02J 7/35 320/101 |
| 2014/0288756 A1 | 9/2014 | Tanaka et al. |

(Continued)

FOREIGN PATENT DOCUMENTS

| JP | 2013-103516 A | 5/2013 |
| JP | 2013-150525 A | 8/2013 |
| JP | 2017-103950 A | 6/2017 |

*Primary Examiner* — Pinping Sun
(74) *Attorney, Agent, or Firm* — Sughrue Mion, PLLC

(57) ABSTRACT

A driving relay comprises a first relay provided on one line of a positive electrode-side line and a negative electrode-side line of power lines; a second relay provided on the other line; and a first precharge circuit configured such that a resistance element and a third relay are connected in series to bypass the second relay. A charging relay comprises a fourth relay provided on the one line of the positive electrode-side line and the negative electrode-side line of the power lines; a fifth relay provided on the other line; and a second precharge circuit configured such that a sixth relay and the resistance element shared with the first precharge circuit are connected in series to bypass the fifth relay. The third relay, the fifth relay and the sixth relay are to be switched on when the first relay is switched on and the second relay has an off-failure.

8 Claims, 7 Drawing Sheets

(56) References Cited

U.S. PATENT DOCUMENTS

| | | | |
|---|---|---|---|
| 2015/0191164 A1* | 7/2015 | Kinomura | B60L 53/14 |
| | | | 701/22 |
| 2015/0375633 A1* | 12/2015 | Masuda | B60L 50/66 |
| | | | 320/109 |
| 2016/0186644 A1* | 6/2016 | Murata | F01P 7/026 |
| | | | 454/75 |
| 2017/0059658 A1* | 3/2017 | Tanaka | G01R 31/3278 |
| 2017/0240160 A1* | 8/2017 | Park | B60L 3/0084 |
| 2018/0093660 A1* | 4/2018 | Koshiba | B60L 58/12 |
| 2018/0134163 A1* | 5/2018 | Kuribara | B60L 50/64 |
| 2018/0162233 A1* | 6/2018 | Oya | B60L 58/40 |
| 2019/0160949 A1* | 5/2019 | Inokuma | B60L 3/0061 |

* cited by examiner

MOTOR VEHICLE

This application claims priority to Japanese Patent Application No. 2017-48156 filed 14 Mar. 2017, the contents of which is incorporated herein by reference.

TECHNICAL FIELD

The present disclosure relates to a motor vehicle and more specifically to a motor vehicle equipped with a motor, a power storage device, a charger, a driving relay and a charging relay.

BACKGROUND

A proposed configuration of a motor vehicle includes a motor; a battery configured as a power storage device to supply electric power to the motor via power lines; a charger configured to charge the power storage device via the power lines using electric power from an external power supply; a driving relay provided between the power storage device and the motor in the power lines; and a charging relay provided between the power storage device and the charger in the power lines (as described in, for example, JP 2013-183495A). The driving relay includes a positive electrode-side driving relay provided on a positive electrode-side line of the power lines; a negative electrode-side driving relay provided on a negative electrode-side line of the power lines; and a driving precharge circuit configured such that a precharge resistance and a driving precharge relay are connected in series to bypass the negative electrode-side driving relay. The charging relay includes a positive electrode-side charging relay provided on the positive electrode-side line of the power lines; a negative electrode-side charging relay provided on the negative electrode-side line of the power lines; and a charging precharge circuit configured such that a charging precharge relay and the precharge resistance shared by the driving precharge circuit are connected in series to bypass the negative electrode-side charging relay.

SUMMARY

There is a demand for further improving the user's convenience in such a motor vehicle. For example, there is a need to enable the motor vehicle to be driven even in the case of an off-failure of part of the driving relay (negative electrode-side driving relay) during driving. There is also a need to allow for external charging even in the case of an off-failure of part of the charging relay (negative electrode-side charging relay) during external charging that causes the charger to charge the battery with electric power from the external power supply.

A motor vehicle of the present disclosure mainly aims to further improve the user's convenience.

In order to achieve the above main object, the motor vehicle of the present disclosure may be implemented by the following aspects.

According to one aspect of the present disclosure, there is a first motor vehicle comprising: a motor for driving; a power storage device configured to supply electric power to the motor via power lines; a charger configured to perform external charging that charges the power storage device via the power line using electric power from an external power supply; a driving relay provided between the power storage device and the motor in the power lines; a charging relay provided between the power storage device and the charger in the power lines; and a control device configured to control the driving relay and the charging relay, wherein the driving relay comprises a first relay provided on one line of a positive electrode-side line and a negative electrode-side line of the power lines; a second relay provided on the other line of the positive electrode-side line and the negative electrode-side line; and a first precharge circuit configured such that a resistance element and a third relay are connected in series to bypass the second relay, the charging relay comprises a fourth relay provided on the one line of the positive electrode-side line and the negative electrode-side line; a fifth relay provided on the other line of the positive electrode-side line and the negative electrode-side line; and a second precharge circuit configured such that a sixth relay and the resistance element shared with the first precharge circuit are connected in series to bypass the fifth relay, and the control device switches on the third relay, the fifth relay and the sixth relay when the first relay is switched on and the second relay has an off-failure.

In the first motor vehicle of this aspect, the driving relay comprises the first relay provided on one line of the positive electrode-side line and the negative electrode-side line of the power lines; the second relay provided on the other line of the positive electrode-side line and the negative electrode-side line; and the first precharge circuit configured such that the resistance element and the third relay are connected in series to bypass the second relay. The charging relay comprises the fourth relay provided on the one line of the positive electrode-side line and the negative electrode-side line; the fifth relay provided on the other line of the positive electrode-side line and the negative electrode-side line; and the second precharge circuit configured such that the sixth relay and the resistance element shared with the first precharge circuit are connected in series to bypass the fifth relay. The first motor vehicle switches on the third relay, the fifth relay and the sixth relay when the first relay is switched on and the second relay has an off-failure. This forms a circuit in which electric current flows in the sequence of the positive electrode of the power storage device, the first relay, the motor, the third relay, the sixth relay, the fifth relay, and the negative electrode of the power storage device. This configuration enables the first motor vehicle to be driven with supply of electric power from the power storage device to the motor (emergency drive) even in the case of an off-failure of the second relay. As a result, this further improves the user's convenience. In this state, no electric current flows in the resistance element, so that this suppresses an increase of the loss.

According to another aspect of the present disclosure, there is a second motor vehicle comprising: a motor for driving; a power storage device configured to supply electric power to the motor via power lines; a charger configured to perform external charging that charges the power storage device via the power line using electric power from an external power supply; a driving relay provided between the power storage device and the motor in the power lines; a charging relay provided between the power storage device and the charger in the power lines; and a control device configured to control the driving relay and the charging relay, wherein the driving relay comprises a first relay provided on one line of a positive electrode-side line and a negative electrode-side line of the power lines; a second relay provided on the other line of the positive electrode-side line and the negative electrode-side line; and a first precharge circuit configured such that a resistance element and a third relay are connected in series to bypass the second relay, the charging relay comprises a fourth relay provided on the one line of the positive electrode-side line and the negative electrode-side line; a fifth relay provided on the other line of the positive electrode-side line and the negative electrode-side line; and a second precharge circuit configured such that a sixth relay and the resistance element shared with the first precharge circuit are connected in series to bypass the fifth relay, and the control device switches on the second relay, the third relay and the sixth relay when the fourth relay is switched on and the fifth relay has an off-failure during the external charging.

In the second motor vehicle of this aspect, the driving relay comprises the first relay provided on one line of the positive electrode-side line and the negative electrode-side line of the power lines; the second relay provided on the other line of the positive electrode-side line and the negative electrode-side line; and the first precharge circuit configured such that the resistance element and the third relay are connected in series to bypass the second relay. The charging relay comprises the fourth relay provided on the one line of the positive electrode-side line and the negative electrode-side line; the fifth relay provided on the other line of the positive electrode-side line and the negative electrode-side line; and the second precharge circuit configured such that the sixth relay and the resistance element shared with the first precharge circuit are connected in series to bypass the fifth relay. The second motor vehicle switches on the second relay, the third relay and the sixth relay when the fourth relay is switched on and the fifth relay has an off-failure during the external charging. This forms a circuit in which electric current flows in the sequence of the charger, the fourth relay, the power storage device, the second relay, the third relay, the sixth relay and the charger. This configuration allows for external charging even in the case of an off-failure of the fifth relay. As a result, this further improves the user's convenience. In this state, no electric current flows in the resistance element, so that this suppresses an increase of the loss.

BRIEF DESCRIPTION OF DRAWINGS

FIG. 3 is a diagram illustrating the flow of electric current when a motor is driven in the state that a positive electrode-side relay and a precharge relay of a driving relay and a negative electrode-side relay and a precharge relay of a charging relay are all ON;

FIG. 5 is a diagram illustrating the flow of electric current when a charger is driven in the state that a positive electrode-side relay and the precharge relay of the charging relay and a negative electrode-side relay and the precharge relay of the driving relay are all ON;

DESCRIPTION OF EMBODIMENTS

The following describes some aspects of the present disclosure with reference to embodiments.

Figure 1:
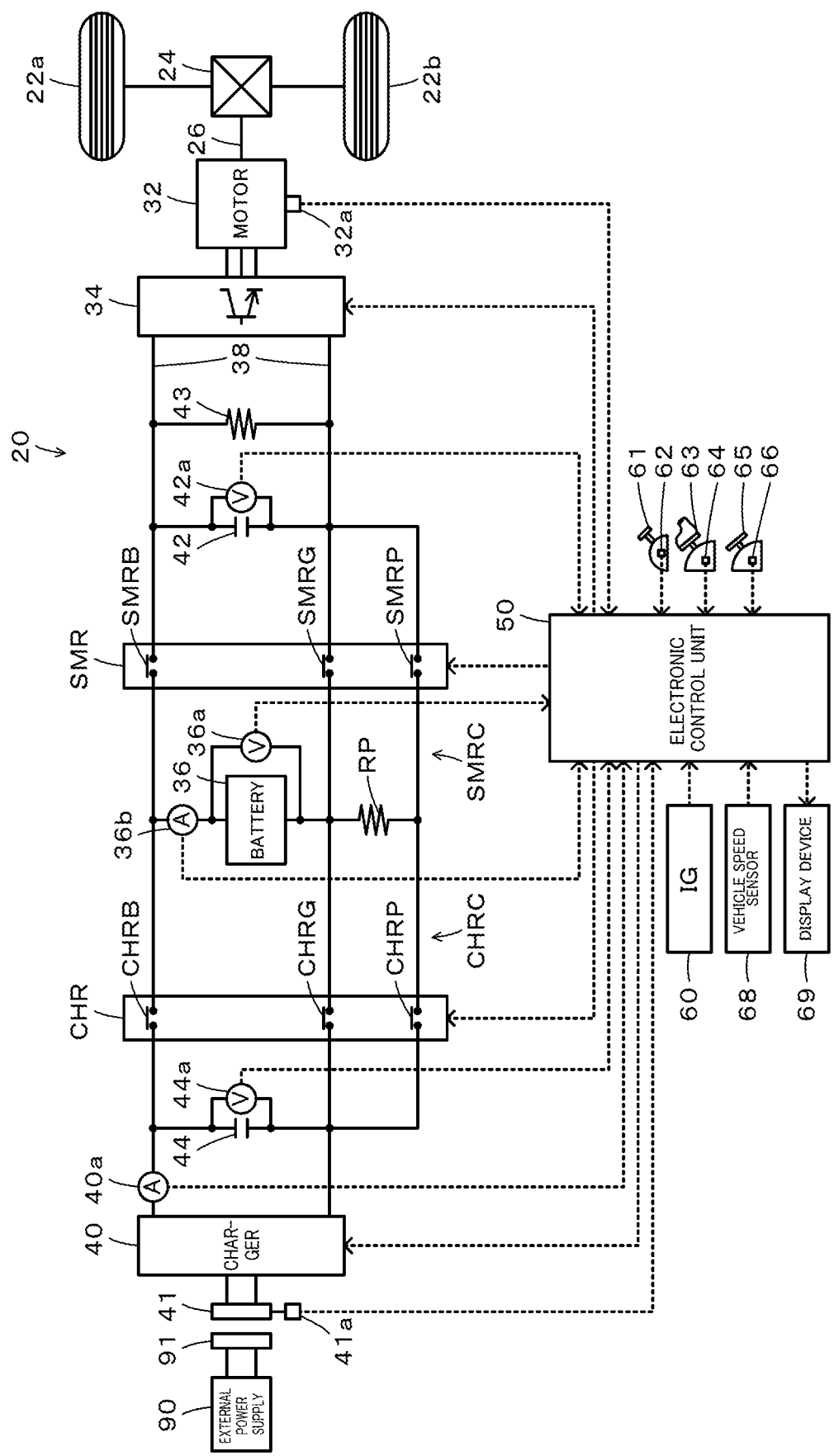
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. As illustrated, the electric vehicle 20 of the embodiment includes a motor 32, an inverter 34, a battery 36 as a power storage device, a driving relay SMR, a charging relay CHR, a charger 40 and an electronic control unit 50.

The motor 32 is configured as, for example, a synchronous generator motor and is connected with a driveshaft 26 that is coupled with drive wheels 22a and 22b via a differential gear 24. The inverter 34 is used to drive the motor 32 and is connected with power lines 38. The electronic control unit 50 performs switching control of a plurality of switching elements (not shown) included in the inverter 34, so as to rotate and drive the motor 32.

The battery 36 is configured as, for example, a lithium ion rechargeable battery or a nickel metal hydride battery and is connected with the power lines 38. A capacitor 42 for smoothing and a discharge resistance 43 for discharging are placed in parallel with each other between the battery 36 and the inverter 34 in the power lines 38.

The charger 40 is connected with the power lines 38 and is configured to perform external charging that charges the battery 36 using electric power from an external power supply 90 such as a household power supply or an industrial power supply when a vehicle-side connector 41 is connected with a power supply-side connector 91 of the external power supply 90 at a charging point such as at home or at a charging station. This charger 40 is controlled by the electronic control unit 50. A capacitor 44 for smoothing is placed between the battery 36 and the charger 40 in the power lines 38.

The driving relay SMR is provided between the battery 36 and the inverter 34 along with the capacitor 42 in the power lines 38. This driving relay SMR is configured to include a positive electrode-side relay SMRB provided on a positive electrode-side line of the power lines 38, a negative electrode-side relay SMRG provided on a negative electrode-side line of the power lines 38, and a precharge circuit SMRC including a precharge resistance RP and a precharge relay SMRP that are connected in series such as to bypass the negative electrode-side relay SMRG. The driving relay SMR is controlled on and off by the electronic control unit 50 to connect and disconnect the battery 36-side with and from the inverter 34 and the capacitor 42-side.

The charging relay CHR is provided between the battery 36 and the charger 40 along with the capacitor 44. This charging relay CHR is configured to include a positive electrode-side relay CHRB provided on the positive electrode-side line of the power lines 38, a negative electrode-side relay CHRG provided on the negative electrode-side line of the power lines 38, and a precharge circuit CHRC including the precharge resistance RP and a precharge relay CHRP that are connected in series such as to bypass the negative electrode-side relay CHRG. The precharge resistance RP is shared by the precharge circuit SMRC and the precharge circuit CHRC. The charging relay CHR is controlled on and off by the electronic control unit 50 to connect and disconnect the battery 36-side with and from the charger 40 and the capacitor 44-side.

The electronic control unit 50 is configured as a CPU-based microprocessor and includes a ROM configured to store processing programs, a RAM configured to temporarily store data and input/output ports, in addition to the CPU, although not being illustrated. Signals from various sensors are input into the electronic control unit 50 via the input port. The signals input into the electronic control unit 50 include, for example, a rotational position θm of a rotor of the motor 32 from a rotational position sensor 32a configured to detect the rotational position of the rotor of the motor 32, a voltage Vb of the battery 36 from a voltage sensor 36a mounted between terminals of the battery 36, and an electric current Ib of the battery 36 from a current sensor 36b mounted to an output terminal of the battery 36. The input signals also include an output current Ich of the charger 40 from a current sensor 40a mounted to an output terminal of the charger 40 and a connection detection signal from a connection detection sensor 41a that is attached to the vehicle-side connector 41 and that is configured to detect connection between the vehicle-side connector 41 and the power supply-side connector 91. The input signals additionally include a voltage VL1 of the capacitor 42 from a voltage sensor 42a mounted between terminals of the capacitor 42 and a voltage VL2 of the capacitor 44 from a voltage sensor 44a mounted between terminals of the capacitor 44. The input signals further include an ignition signal from an ignition switch 60 and a shift position SP from a shift position sensor 62 configured to detect an operating position of a shift lever 61. Furthermore, the input signals include an accelerator position Acc from an accelerator pedal position sensor 64 configured to detect a depression amount of an accelerator pedal 63, a brake pedal position BP from a brake pedal position sensor 66 configured to detect a depression amount of a brake pedal 65, and a vehicle speed V from a vehicle speed sensor 68. Various controls signals are output from the electronic control unit 50 via the output port. The signals output from the electronic control unit 50 include, for example, control signals to the inverter 34, control signals to the charger 40, control signals to the driving relay SMR, control signals to the charging relay CHR, and control signals to a display device 69 configured to display information. The electronic control unit 50 calculates a state of charge SOC of the battery 36, based on an integrated value of the electric current Ib of the battery 36 input from the current sensor 36b.

In the electric vehicle 20 of the embodiment having the above configuration, in response to the user's (driver's) ON operation of the ignition switch 60, the electronic control unit 50 turns on the driving relay SMR to set the ready-on (drivable) state. A connection process in the case of turning on the driving relay SMR switches on the positive electrode-side relay SMRB and the precharge relay SMRP to pre-charge (charge) the capacitor 42 and subsequently switches on the negative electrode-side relay SMRG and switches off the precharge relay SMRP. Switching on the positive electrode-side relay SMRB and the precharge relay SMRP forms a circuit of the positive electrode of the battery 36, the positive electrode-side relay SMRB, the capacitor 42, the precharge relay SMRP, the precharge resistance RP and the negative electrode of the battery 36, so as to pre-charge (charge) the capacitor 42. Pre-charging of the capacitor 42 is determined to be completed when the voltage VL1 of the capacitor 42 becomes equal to or higher than a reference value VLref1 that is slightly lower than the voltage Vb of the battery 36. After the driving relay SMR is turned on, the electric vehicle 20 is driven with driving and controlling the motor 32 according to the user's accelerator operation. In response to the user's OFF operation of the ignition switch 60, the electronic control unit 50 turns off the driving relay SMR to set the ready-off state. In the description below, a time period from an ON operation to an OFF operation of the ignition switch 60 is called "trip".

In the electric vehicle 20 of the embodiment, in response to the user's connection of the vehicle-side connector 41 with the power supply-side connector 91 of the external power supply 90 (in response to a rise of the connection detection signal from the connection detection sensor 41a to ON signal) in the state that the ignition switch 60 is OFF at a charging point such as at home or at a charging station, the electronic control unit 50 switches on the charging relay CHR. A connection process in the case of turning on the charging relay CHR switches on the positive electrode-side relay CHRB and the precharge relay CHRP to pre-charge (charge) the capacitor 44 and subsequently switches on the negative electrode-side relay CHRG and switches off the precharge relay CHRP. Switching on the positive electrode-side relay CHRB and the precharge relay CHRP forms a circuit of the positive electrode of the battery 36, the positive electrode-side relay CHRB, the capacitor 44, the precharge relay CHRP, the precharge resistance RP and the negative electrode of the battery 36, so as to pre-charge (charge) the capacitor 44. Pre-charging of the capacitor 44 is determined to be completed when the voltage VL2 of the capacitor 44 becomes equal to or higher than a reference value VLref2 (for example, a value equal to the reference value VLref1) that is slightly lower than the voltage Vb of the battery 36. After the charging relay CHR is turned on, the electronic control unit 50 controls the charger 40 to perform external charging (i.e., to charge the battery 36 with power from the external power supply 90). When the state of charge SOC of the battery 36 reaches a predetermined rate Sch (for example, 80%, 85% or 90%), the electronic control unit 50 terminates the control of the charger 40 to terminate the external charging and turns off the charging relay CHR.

Figure 2:
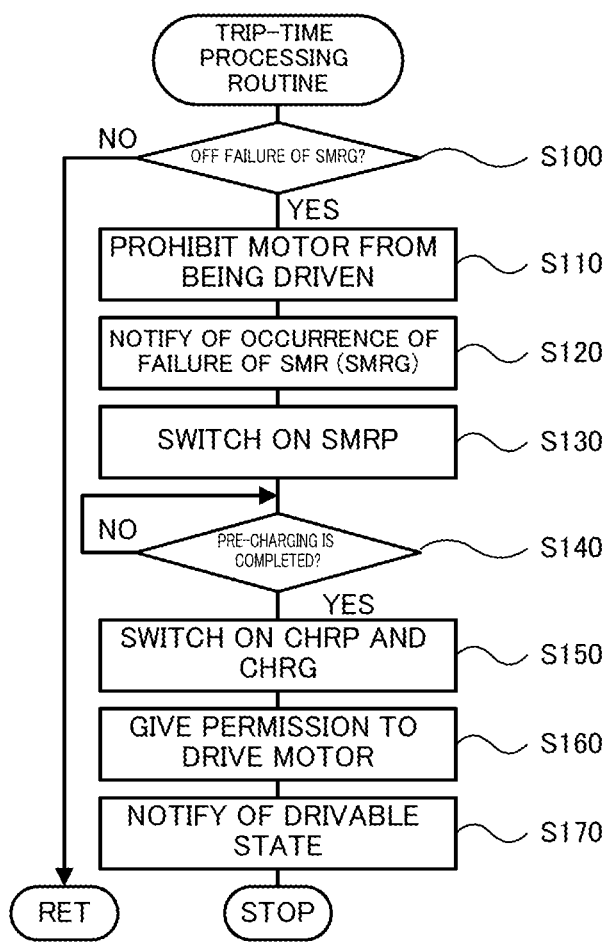
FIG. 2 is a flowchart showing one example of a trip-time processing routine performed by an electronic control unit.

The following describes the operations of the electric vehicle 20 of the embodiment having the above configuration or more specifically a series of operations in the event of an off-failure of the negative electrode-side relay SMRG of the driving relay SMR during a trip (during a time period from an ON operation to an OFF operation of the ignition switch 60). FIG. 2 is a flowchart showing one example of a trip-time processing routine performed by the electronic control unit 50. This routine is performed repeatedly during a trip when the negative electrode-side relay SMRG of the driving relay SMR has no off-failure. It is here assumed that the positive electrode-side relay SMRB of the driving relay SMR is normally switched on.

When the trip-time processing routine of FIG. 2 is triggered, the electronic control unit 50 first determines whether the negative electrode-side relay SMRG of the driving relay SMR has an off-failure (step S100). In the case of an off-failure of the negative electrode-side relay SMRG of the driving relay SMR after completion of pre-charging of the capacitor 42, no electric power is supplied from the battery to the inverter 34 (motor 32)-side. This results in decreasing the voltage VL1 of the capacitor 42 due to driving of the motor 32 and power consumption of the discharge resistance 43. It is thus determinable whether the negative electrode-side relay SMRG of the driving relay SMR has an off-failure, for example, by comparing the voltage VL1 of the capacitor 42 input from the voltage sensor 42a with a reference value Vref3 that is lower than the voltage Vb of the battery 36 and that is also lower than the above reference value Vref1, after completion of pre-charging of the capacitor 42. When it is determined that the negative electrode-side relay SMRG of the driving relay SMR has no off-failure (i.e., is normal), the electronic control unit 50 immediately terminates this routine. For a time period from an ON operation of the ignition switch 60 to completion of pre-charging of the capacitor 42, the negative electrode-side relay SMRG of the driving relay SMR is not switched on.

The electronic control unit 50 accordingly terminates this routine immediately in this case.

When it is determined at step S100 that the negative electrode-side relay SMRG of the driving relay SMR has an off-failure, the electronic control unit 50 prohibits the motor from being driven (step S110) and provides a display indicating the occurrence of a failure of the driving relay SMR or the negative electrode-side relay SMRG on the display device 69 (step S120). In response to prohibition of driving of the motor 32, the electronic control unit 50 maintains the non-driving state when the motor 32 is not driven (for example, prior to a start of driving the electric vehicle 20), while stopping driving the motor 32 when the motor 32 is driven. Providing the display indicating the occurrence of a failure of the driving relay SMR or the negative electrode-side relay SMRG on the display device 69 notifies the user of and causes the user to recognize the occurrence of a failure of the driving relay SMR or the negative electrode-side relay SMRG.

The electronic control unit 50 subsequently switches on the precharge relay SMRP of the driving relay SMR to pre-charge the capacitor 42 (step S130) and waits for completion of pre-charging of the capacitor 42 (step S140). Pre-charging of the capacitor 42 is described above. On completion of pre-charging of the capacitor 42, the electronic control unit 50 switches on the negative electrode-side relay CHRG and the precharge relay CHRP of the charging relay CHR (step S150), gives permission to drive the motor 32 (step S160), provides a display indicating that the electric vehicle 20 is still drivable (emergency drive) (step S170) and then terminates this routine. When permission is given to drive the motor 32, the electronic control unit 50 starts (resumes) driving the motor 32 according to the user's accelerator operation.

Figure 3:
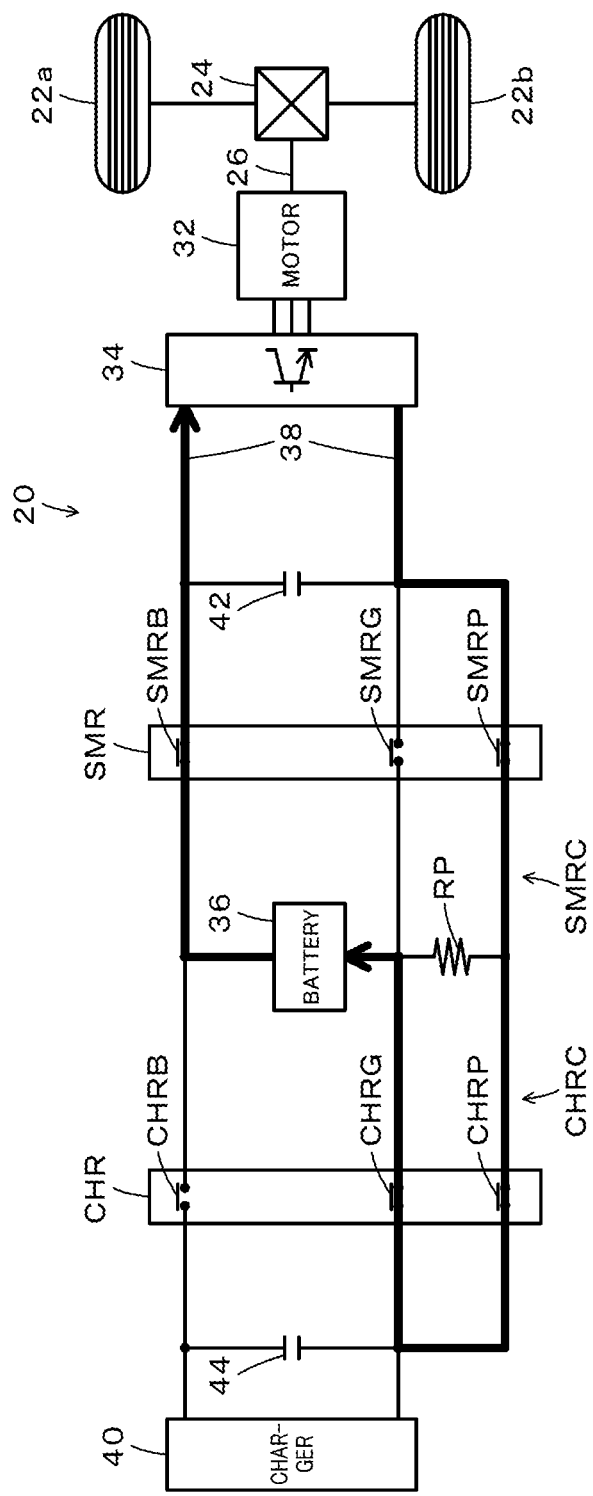

FIG. 3 is a diagram illustrating the flow of electric current when the motor 32 is driven in the state that the positive electrode-side relay SMRB and the precharge relay SMRP of the driving relay SMR and the negative electrode-side relay CHRG and the precharge relay CHRP of the charging relay CHR are all ON. In this state, the electric current flows in the sequence of the positive electrode of the battery 36, the positive electrode-side relay SMRB, the inverter 34 (motor 32), the precharge relay SMRP, the precharge relay CHRP, the negative electrode-side relay CHRG and the negative electrode of the battery 36 as shown by thick solid lines of FIG. 3. This enables the electric vehicle 20 to be driven with supply of electric power from the battery 36 via the inverter 34 to the motor 32 (emergency drive). In this state, no electric current flows through the precharge resistance RP, so that this configuration suppresses an increase of the loss. The negative electrode-side relay CHRG and the precharge relay CHRP of the charging relay CHR are switched on after completion of pre-charging of the capacitor 42. This configuration suppresses the flow of high current when the negative electrode-side relay CHRG and the precharge relay CHRP are switched on and thereby suppresses adhesion of the negative electrode-side relay CHRG and the precharge relay CHRP. Providing the display indicating that the electric vehicle 20 is still drivable (emergency drive) on the display device 69 notifies the user of and causes the user to recognize the drivable state of the electric vehicle 20 even in the event of a failure of the driving relay SMR (i.e., in the event of an off-failure of the negative electrode-side relay SMRG). A display urging to go to an automobile dealer or the like may be displayed on the display device 69, in addition to the display that permission is given to drive the electric vehicle 20.

Figure 4:
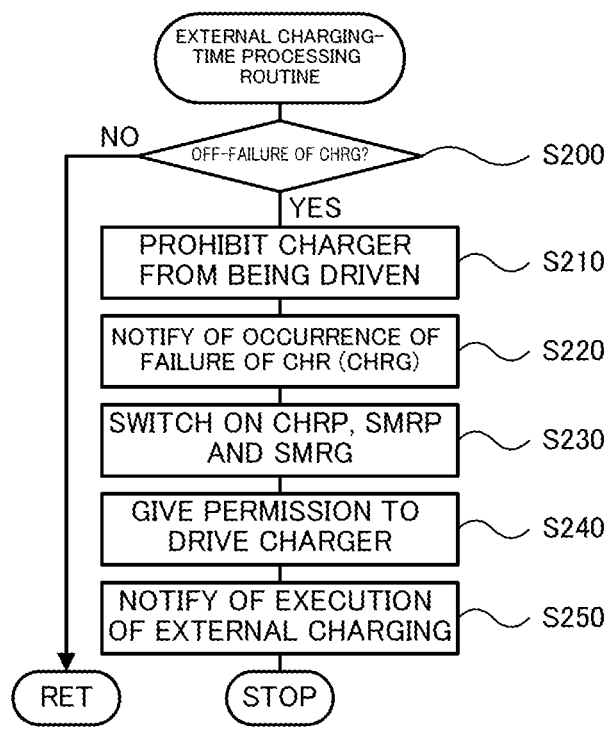
FIG. 4 is a flowchart showing one example of an external charging-time processing routine performed by the electronic control unit.

The following describes a series of operations when the negative electrode-side relay CHRG of the charging relay CHR has an off-failure during external charging (i.e., for a time period from connection of the vehicle-side connector 41 with the power supply-side connector 91 of the external power supply 90 to completion of external charging). FIG. 4 is a flowchart showing one example of an external charging-time processing routine performed by the electronic control unit 50. This routine is performed repeatedly during external charging when the negative electrode-side relay CHRG of the charging relay CHR has no off-failure. It is here assumed that the positive electrode-side relay CHRB of the charging relay CHR is normally switched on.

When the external charging-time processing routine of FIG. 4 is triggered, the electronic control unit 50 first determines whether the negative electrode-side relay CHRG of the charging relay CHR has an off-failure (step S200). In the case of an off-failure of the negative electrode-side relay CHRG of the charging relay CHR after completion of pre-charging of the capacitor 44, no electric power is supplied from the charger 40 to the battery 36-side, so that the output current Ich of the charger 40 becomes approximately equal to value 0. It is thus determinable whether the negative electrode-side relay CHRG of the charging relay CHR has an off-failure, for example, by comparing the output current Ich of the charger 40 input from the current sensor 40a with a reference value Ichref that is slightly larger than the value 0, after completion of pre-charging of the capacitor 44. When it is determined that the negative electrode-side relay CHRG of the charging relay CHR has no off-failure (i.e., is normal), the electronic control unit 50 immediately terminates this routine. For a time period from connection of the vehicle-side connector 41 with the power supply-side connector 91 of the external power supply 90 to completion of pre-charging of the capacitor 44, the negative electrode-side relay CHRG of the charging relay CHR is not switched on. The electronic control unit 50 accordingly terminates this routine immediately in this case.

When it is determined at step S200 that the negative electrode-side relay CHRG of the charging relay CHR has an off-failure, the electronic control unit 50 prohibits the charger 40 from being drive (step S210) and provides a display indicating the occurrence of a failure of the charging relay CHR on the display device 69 (step S220). In response to prohibition of driving of the charger 40, the electronic control unit 50 maintains the non-driving state when the charger 40 is not driven (for example, prior to a start of external charging), while stopping driving the charger 40 when the charger 40 is driven. Providing the display indicating the occurrence of a failure of the charging relay CHR on the display device 69 notifies the user of and causes the user to recognize the occurrence of a failure of the charging relay CHR.

The electronic control unit 50 subsequently switches on the precharge relay CHRP of the charging relay CHR and the negative electrode-side relay SMRG and the precharge relay SMRP of the driving relay SMR (step S230), gives permission to drive the charger 40 (step S240), provides a display indicating that external charging is to be performed on the display device 69 (step S250) and then terminates this routine. When permission is given to drive the charger 40, the electronic control unit 50 starts (resumes) driving the charger 40.

Figure 5:
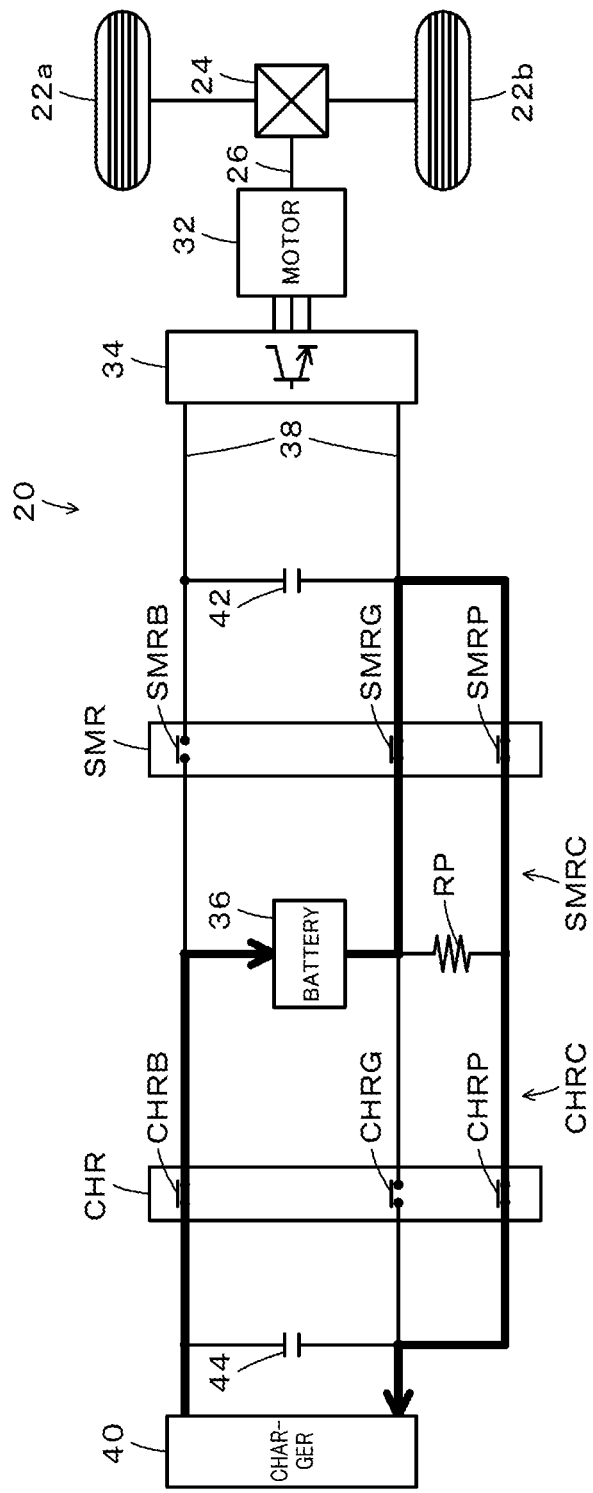

FIG. 5 is a diagram illustrating the flow of electric current when the charger 40 is driven in the state that the positive electrode-side relay CHRB and the precharge relay CHRP of the charging relay CHR and the negative electrode-side relay SMRG and the precharge relay SMRP of the driving relay SMR are all ON. In this case, the electric current flows in the sequence of the charger 40, the positive electrode-side relay CHRB, the battery 36, the negative electrode-side relay SMRG, the precharge relay SMRP, the precharge relay CHRP and the charger 40 as shown by thick solid lines of FIG. 5. This enables electric power to be supplied from the charger 40 to the battery 36 (i.e., allows for external charging). As a result, this configuration increases the state of charge SOC of the battery 36 and thereby increases the drivable distance in a next trip, compared with a configuration that terminates external charging in the event of an off-failure of the negative electrode-side relay CHRG of the charging relay CHR. In this state, no electric current flows through the precharge resistance RP, so that this configuration suppresses an increase of the loss. Providing the display that external charging is to be performed on the display device 69 notifies the user of and causes the user to recognize the permission for external charging even in the event of a failure of the charging relay CHR (i.e., in the event of an off-failure of the negative electrode-side relay CHRG).

As described above, in the event of an off-failure of the negative electrode-side relay SMRG of the driving relay SMR during a trip in the state that the positive electrode-side relay SMRB is normally switched on, the electric vehicle 20 of the embodiment switches on the precharge relay SMRP of the driving relay SMR and the negative electrode-side relay CHRG and the precharge relay CHRP of the charging relay CHR. This configuration enables the electric vehicle 20 to be driven with supply of electric power from the battery 36 via the inverter 34 to the motor 32 (emergency drive) even in the event of an off-failure of the negative electrode-side relay SMRG of the driving relay SMR.

In the event of an off-failure of the negative electrode-side relay CHRG of the charging relay CHR during external charging in the state that the positive electrode-side relay CHRB is normally switched on, the electric vehicle 20 of the embodiment switches on the precharge relay CHRP of the charging relay CHR and the negative electrode-side relay SMRG and the precharge relay SMRP of the driving relay SMR. This configuration enables electric power to be supplied from the charger 40 to the battery 36 (i.e., allows for external charging) even in the event of an off-failure of the negative electrode-side relay CHRG of the charging relay CHR. As a result, this configuration increases the state of charge SOC of the battery 36 and thereby increases the drivable distance in a next trip, compared with a configuration that terminates external charging in the event of an off-failure of the negative electrode-side relay CHRG of the charging relay CHR.

In the case of an off-failure of the negative electrode-side relay SMRG of the driving relay SMR during a trip in the state that the positive electrode-side relay SMRB is normally switched on, the electric vehicle 20 of the embodiment switches on the precharge relay SMRP of the driving relay SMR to pre-charge the capacitor 42 and subsequently switches on the negative electrode-side relay CHRG and the precharge relay CHRP of the charging relay CHR. A modification may switch on the negative electrode-side relay CHRG and the precharge relay CHRP of the charging relay CHR, approximately simultaneously with the precharge relay SMRP of the driving relay SMR.

In the case of an off-failure of the negative electrode-side relay SMRG of the driving relay SMR during a trip in the state that the positive electrode-side relay SMRB is normally switched on, the electric vehicle 20 of the embodiment provides a display indicating the occurrence of a failure of the driving relay SMR (negative electrode-side relay SMRG) on the display device 69. The electric vehicle 20 subsequently switches on the precharge relay SMRP of the driving relay SMR and the negative electrode-side relay CHRG and the precharge relay CHRP of the charging relay CHR and provides a display indicating that the electric vehicle 20 is drivable (emergency drive) on the display device 69. A modification may provide only the former display on the display device 69 or may provide neither the former display nor the latter display on the display device 69. Instead of displaying these pieces of information on the display device 69, another modification may light up warning lamps or may provide a voice output from a speaker.

In the case of an off-failure of the negative electrode-side relay CHRG of the charging relay CHR during external charging in the state that the positive electrode-side relay CHRB is normally switched on, the electric vehicle 20 of the embodiment provides a display indicating the occurrence of a failure of the charging relay CHR (negative electrode-side relay CHRG) on the display device 69. The electric vehicle 20 subsequently switches on the precharge relay CHRP of the charging relay CHR and the negative electrode-side relay SMRG and the precharge relay SMRP of the driving relay SMR and provides a display indicating that external charging is to be performed on the display device 69. A modification may provide only the former display on the display device 69 or may provide neither the former display nor the latter display on the display device 69. Instead of displaying these pieces of information on the display device 69, another modification may light up warning lamps or may provide a voice output from a speaker.

In the electric vehicle 20 of the embodiment, the precharge circuit SMRC of the driving relay SMR is configured such that the precharge resistance RP and the precharge relay SMRP are connected in series to bypass the negative electrode-side relay SMRG, and the precharge circuit CHRC of the charging relay CHR is configured such that the precharge relay CHRP and the precharge resistance RP shared with the precharge circuit SMRC are connected in series to bypass the negative electrode-side relay CHRG. According to a modification, however, the precharge circuit SMRC of the driving relay SMR may be configured such that the precharge resistance RP and the precharge relay SMRP are connected in series to bypass the positive electrode-side relay SMRB. The precharge circuit CHRC of the charging relay CHR may be configured such that the precharge relay CHRP and the precharge resistance RP shared with the precharge circuit SMRC are connected in series to bypass the positive electrode-side relay CHRB.

Figure 6:
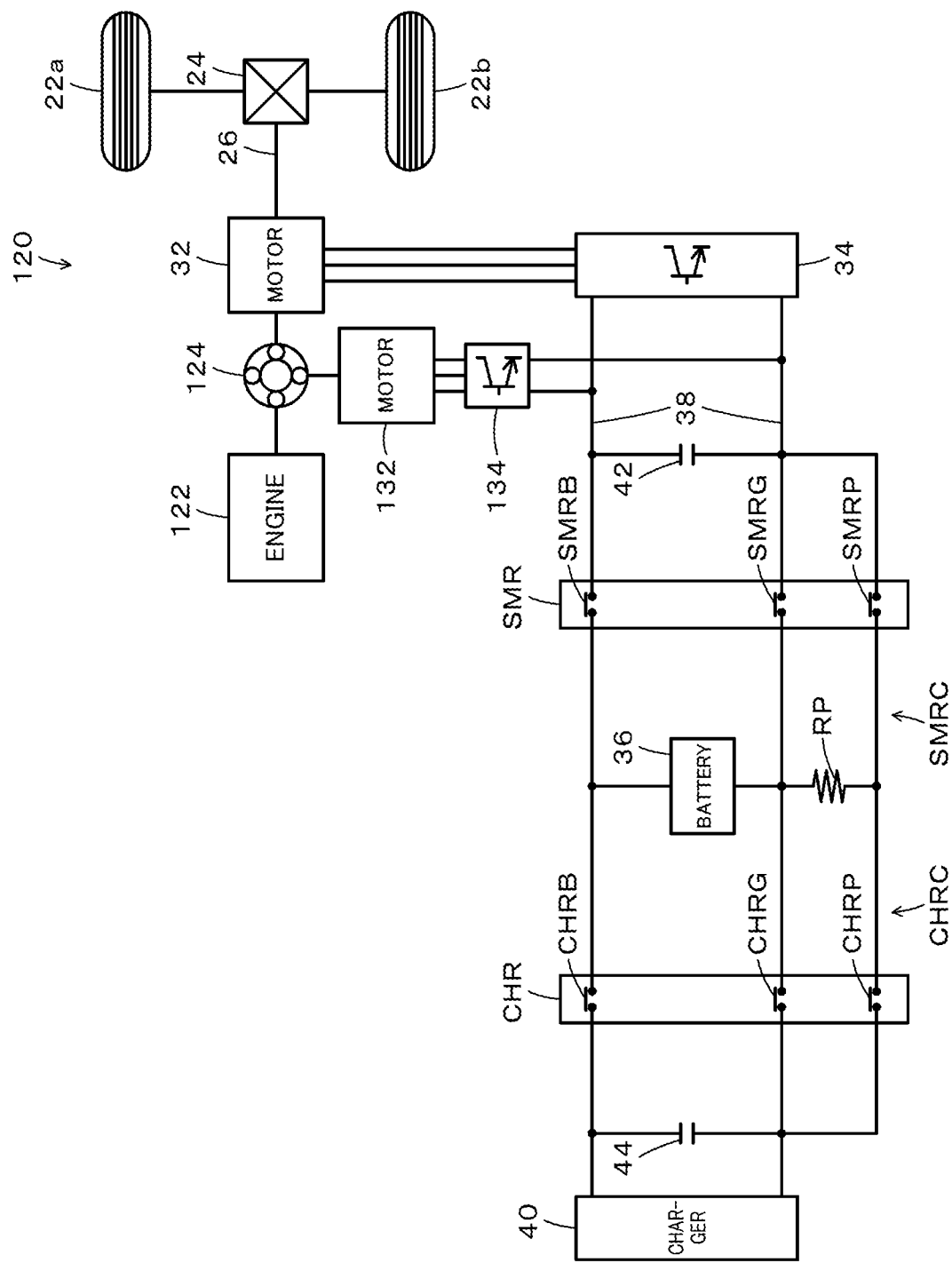
FIG. 6 is a configuration diagram illustrating the schematic configuration of a hybrid vehicle according to a modification.
Figure 7:
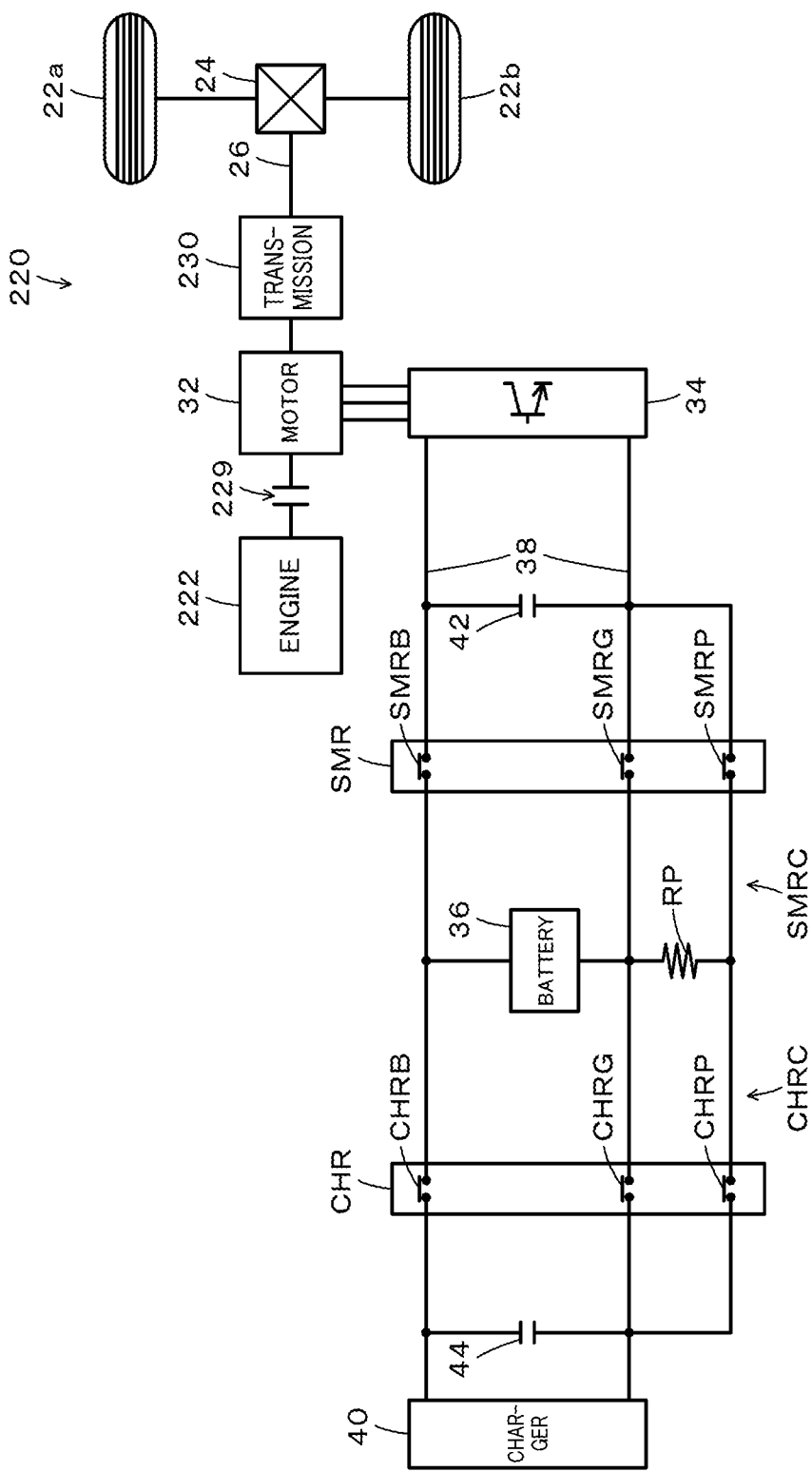
FIG. 7 is a configuration diagram illustrating the schematic configuration of a hybrid vehicle according to another modification.

The embodiment describes application of the present disclosure to the configuration of the electric vehicle 20 in which the motor 32 is connected with the driveshaft 26 that is coupled with the drive wheels 22a and 22b as shown in FIG. 1. The present disclosure is also applicable to the configuration of a hybrid vehicle 120 according to a modification of FIG. 6, in which an engine 122 and a motor 132 are connected with a driveshaft 26 via a planetary gear 124, in addition to connection of a motor 32 with the driveshaft 26 that is coupled with drive wheels 22a and 22b. The motor 132 is driven by an inverter 134 that is connected with power lines 38. The present disclosure is further applicable to the configuration of a hybrid vehicle 220 according to another modification of FIG. 7, in which a transmission 230 is provided between a motor 32 and a driveshaft 26 that is coupled with drive wheels 22a and 22b and an engine 222 is connected with the motor 32 via a clutch 229. Performing the trip-time processing routine of FIG. 2 described above in these hybrid vehicles further improves the driving performance (emergency driving performance), compared with a configuration that causes the hybrid vehicle to be driven with separation of the motor from the battery (battery-less drive) in the event of an off-failure of the negative electrode-side relay SMRG. Performing the external charging-time processing routine of FIG. 4 described above in these hybrid vehicles increases the state of charge SOC of the battery 36, compared with a configuration that terminates external charging in the event of an off-failure of the negative electrode-side relay CHRG. As a result, this configuration reduces the frequency of starting the engine in a next trip.

The first motor vehicle according to the above aspect of the present disclosure may further comprise a capacitor placed on a motor side of the driving relay on the power lines. When the first relay is switched on and the second relay has an off-failure, the control device may switch on the third relay to pre-charge the capacitor and subsequently switch on the fifth relay and the sixth relay. This configuration suppresses the flow of high current when the fifth relay and the sixth relay are switched on and thereby suppresses adhesion of the fifth relay and the sixth relay.

In the first motor vehicle according to the above aspect of the present disclosure, when the first relay is switched on and the second relay has an off-failure, the control device may notify a user of occurrence of a failure of the driving relay or the second relay. This configuration causes the user to recognize the occurrence of a failure of the driving relay or the second relay. In this aspect, when the first relay is switched on and the second relay has an off-failure, the control device may notify the user of a drivable state of the motor vehicle after switching on the third relay, the fifth relay and the sixth relay. This configuration causes the user to recognize that the motor vehicle is drivable even in the event of a failure of the driving relay (second relay).

In the first motor vehicle according to the above aspect of the present disclosure, the control device may prohibit the motor from being driven until the third relay, the fifth relay and the sixth relay are switched on after detection of the state that the first relay is switched on and the second relay has an off-failure.

In the first motor vehicle according to the above aspect of the present disclosure, when the fourth relay is switched on and the fifth relay has an off-failure during the external charging, the control device may switch on the second relay, the third relay and the sixth relay. This forms a circuit in which electric current flows in the sequence of the charger, the fourth relay, the power storage device, the second relay, the third relay, the sixth relay and the charger. This configuration allows for external charging even in the case of an off-failure of the fifth relay. As a result, this further improves the user's convenience. In this state, no electric current flows in the resistance element, so that this suppresses an increase of the loss.

In the second motor vehicle according to the above aspect of the present disclosure, when the fourth relay is switched on and the fifth relay has an off-failure during the external charging, the control device may notify a user of occurrence of a failure of the charging relay or the fifth relay. This configuration causes the user to recognize the occurrence of a failure of the charging relay or the fifth relay. In this aspect, when the fourth relay is switched on and the fifth relay has an off-failure during the external charging, the control device may notify the user of execution of the external charging after switching on the second relay, the third relay and the sixth relay. This configuration causes the user to recognize that external charging is enabled even in the event of a failure of the charging relay (fifth relay).

In the second motor vehicle according to the above aspect of the present disclosure, the control device may prohibit the charger from being driven until the second relay, the third relay and the sixth relay are switched on after detection of the state that the fourth relay is switched on and the fifth relay has an off-failure during the external charging.

The following describes the correspondence relationship between the primary elements of the above embodiment and the primary elements of the disclosure described in Summary. The motor 32 of the embodiment corresponds to the "motor", the battery 36 corresponds to the "power storage device", and the charger 40 corresponds to the "charger". The driving relay SMR corresponds to the "driving relay", the charging relay CHR corresponds to the "charging relay", and the electronic control unit 50 corresponds to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The present disclosure is applicable to, for example, manufacturing industries of motor vehicles.

The invention claimed is:

1. A motor vehicle, comprising:
 a motor for driving;
 a power storage device configured to supply electric power to the motor via power lines;
 a charger configured to perform external charging that charges the power storage device via the power line using electric power from an external power supply;
 a driving relay provided between the power storage device and the motor in the power lines;
 a charging relay provided between the power storage device and the charger in the power lines; and
 a control device configured to control the driving relay and the charging relay, wherein
 the driving relay comprises a first relay provided on one line of a positive electrode-side line and a negative electrode-side line of the power lines; a second relay provided on the other line of the positive electrode-side line and the negative electrode-side line; and a first precharge circuit configured such that a resistance element and a third relay are connected in series to bypass the second relay,
 the charging relay comprises a fourth relay provided on the one line of the positive electrode-side line and the negative electrode-side line; a fifth relay provided on the other line of the positive electrode-side line and the negative electrode-side line; and a second precharge circuit configured such that a sixth relay and the resistance element shared with the first precharge circuit are connected in series to bypass the fifth relay, and the control device switches on the third relay, the fifth relay and the sixth relay when the first relay is switched on and the second relay has an off-failure.

2. The motor vehicle according to claim 1, further comprising:
a capacitor placed on a motor side of the driving relay on the power lines, wherein
when the first relay is switched on and the second relay has the off-failure, the control device switches on the third relay to pre-charge the capacitor and subsequently switches on the fifth relay and the sixth relay.

3. The motor vehicle according to claim 1,
wherein when the first relay is switched on and the second relay has the off-failure, the control device notifies a user of occurrence of a failure of the driving relay or the second relay.

4. The motor vehicle according to claim 3,
wherein when the first relay is switched on and the second relay has the off-failure, the control device notifies the user of a drivable state of the motor vehicle after switching on the third relay, the fifth relay and the sixth relay.

5. The motor vehicle according to claim 1,
wherein when the fourth relay is switched on and the fifth relay has an off-failure of the fifth relay during the external charging, the control device switches on the second relay, the third relay and the sixth relay.

6. A motor vehicle, comprising:
a motor for driving;
a power storage device configured to supply electric power to the motor via power lines;
a charger configured to perform external charging that charges the power storage device via the power line using electric power from an external power supply;
a driving relay provided between the power storage device and the motor in the power lines;
a charging relay provided between the power storage device and the charger in the power lines; and
a control device configured to control the driving relay and the charging relay, wherein
the driving relay comprises a first relay provided on one line of a positive electrode-side line and a negative electrode-side line of the power lines; a second relay provided on the other line of the positive electrode-side line and the negative electrode-side line; and a first precharge circuit configured such that a resistance element and a third relay are connected in series to bypass the second relay,
the charging relay comprises a fourth relay provided on the one line of the positive electrode-side line and the negative electrode-side line; a fifth relay provided on the other line of the positive electrode-side line and the negative electrode-side line; and a second precharge circuit configured such that a sixth relay and the resistance element shared with the first precharge circuit are connected in series to bypass the fifth relay, and
the control device switches on the second relay, the third relay and the sixth relay when the fourth relay is switched on and the fifth relay has an off-failure during the external charging.

7. The motor vehicle according to claim 6,
wherein when the fourth relay is switched on and the fifth relay has the off-failure during the external charging, the control device notifies a user of occurrence of a failure of the charging relay or the fifth relay.

8. The motor vehicle according to claim 7,
wherein when the fourth relay is switched on and the fifth relay has the off-failure during the external charging, the control device notifies the user of execution of the external charging after switching on the second relay, the third relay and the sixth relay.

* * * * *